US008633848B2

(12) United States Patent
Hilgers

(10) Patent No.: US 8,633,848 B2
(45) Date of Patent: Jan. 21, 2014

(54) METHOD OF CONTROLLING A DEVICE ARRANGEMENT

(75) Inventor: Achim Hilgers, Alsdorf (DE)

(73) Assignee: Koninklijke Philips N.V., Eindhoven (NL)

( * ) Notice: Subject to any disclaimer, the term of this patent is extended or adjusted under 35 U.S.C. 154(b) by 402 days.

(21) Appl. No.: 12/920,140

(22) PCT Filed: Mar. 5, 2009

(86) PCT No.: PCT/IB2009/050893

§ 371 (c)(1),
(2), (4) Date: Aug. 30, 2010

(87) PCT Pub. No.: WO2009/109928

PCT Pub. Date: Sep. 11, 2009

(65) Prior Publication Data

US 2010/0328135 A1 Dec. 30, 2010

(30) Foreign Application Priority Data

Mar. 7, 2008 (EP) .................................... 08102380

(51) Int. Cl.
*H04L 17/02* (2006.01)

(52) U.S. Cl.
USPC .......................................................... 341/176

(58) Field of Classification Search
USPC .................. 341/176; 359/154, 156, 161, 172, 359/180–181; 398/129, 131, 65
See application file for complete search history.

(56) References Cited

U.S. PATENT DOCUMENTS

| | | | |
|---|---|---|---|
| 2,362,832 A | 11/1944 | Land | |
| 6,330,092 B1 | 12/2001 | Aronson | |
| 6,999,685 B1 * | 2/2006 | Kawase et al. | 398/129 |
| 2004/0121740 A1 | 6/2004 | Miyano | |

FOREIGN PATENT DOCUMENTS

| | | |
|---|---|---|
| DE | 3828334 | 2/1990 |
| DE | 69831128 T2 | 6/2006 |
| JP | 2003318793 A | 11/2003 |
| JP | 2004357236 A | 12/2004 |
| WO | 2005086281 A1 | 9/2005 |

* cited by examiner

*Primary Examiner* — Hieu Nguyen

(57) ABSTRACT

The invention describes a method of controlling a device arrangement (D), which method comprises generating at least one electrical signal (10, 11) in a remote control unit (2), converting the generated electrical signal (10, 11) into electromagnetic radiation ($EM_1$, $EM_2$) according to specific polarization parameters, and detecting the electromagnetic radiation ($EM_1$, $EM_2$) with a detecting arrangement ($R_1$, $R_2$). The detecting arrangement ($R_1$, $R_2$) is realized to detect electromagnetic radiation ($EM_1$, $EM_2$) with the specific polarization parameters to obtain an electrical signal (30, 31), which is converted into a device control signal (40, 41) and applied to a device ($L_1$, $L_2$, $L_3$) of the device arrangement (D). The invention further describes a system (1) for controlling a device arrangement (D). The invention also describes a remote control interface module (3) and a remote control unit (2).

14 Claims, 5 Drawing Sheets

METHOD OF CONTROLLING A DEVICE ARRANGEMENT

FIELD OF THE INVENTION

The invention describes a method of controlling a device arrangement, and a system for controlling a device arrangement. The invention further describes a remote control interface unit and a remote control device.

BACKGROUND OF THE INVENTION

Almost every consumer electronics device available today can be controlled using a remote control technique. Examples of such devices are televisions, satellite receivers, air-conditioners, video recorders, tuners, personal computers, etc. Each such device is equipped with an interface receptive to control signals from a remote control unit, usually a hand-held unit with an array of buttons that can be pressed by a user according to the device setting to be adjusted. The device can react at any time to a signal sent by the remote control unit, even when in a ‘standby’ mode of operation.

For the remote control of a device, it is usual to incorporate an interface in the device for detecting electromagnetic radiation transmitted in a wireless manner by a remote control unit. Usually, a beam of infrared light, modulated according to the device setting to be adjusted, is generated by an infrared diode in the front of the remote control unit, and directed at the device being targeted. The device setting to be altered is determined at the receive side by demodulating the received signal. From the point of view of the user, remote controllable devices are convenient because they can be controlled by simply pressing a button on the remote control unit. The user can stay seated, for example, and turn the device on or off or select some setting on the device, simply by pressing buttons on the remote control unit.

Developments in the area of lighting have led to interesting new types of remotely controllable lighting arrangements for commercial use and in the home. An example is given by Philips “Living Colors” lamp, for home use, which can be easily controlled to provide different colours according to the user’s wishes. Up until now, most prior art light sources or lamps are directly attached by means of a fitting to the mains power supply, and can be switched by a switch. Such a switch is usually mounted in the wall in the case of a ceiling lighting fixture, or in a cable attached to the device in the case of a reading light. The newer types of lighting arrangements are still connected to the mains power supply, but can be remotely controlled in the manner described above. However, it may be that the user still must switch the lighting arrangement at a mains switch to physically connect the lighting arrangement to the power supply.

It is an object of the invention to provide a more straightforward remote control technique.

SUMMARY OF THE INVENTION

To this end, the present invention describes a method of controlling a device arrangement, which method comprises generating at least one electrical signal in a remote control unit, converting the generated electrical signal into electromagnetic radiation according to specific polarisation parameters, and detecting the electromagnetic radiation with a detecting arrangement. The detecting arrangement is realised to detect electromagnetic radiation with the specific polarisation parameters, to obtain an electrical signal which is subsequently converted into a device control signal that is then applied to a device of the device arrangement.

‘Polarisation parameters’ refer to the polarisation of the electric field vector of the transmitted electromagnetic radiation. As will be known to a person skilled in the art, the polarisation of an electromagnetic signal is defined by the pattern that would be described by the tip of the electric field vector of the electromagnetic radiation in a plane perpendicular and normal to the direction of propagation of the signal. For example, the signal might exhibit linear, elliptical, or circular polarisation. Depending on the direction of rotation of the electric field, the signal can exhibit ‘left-hand’ or ‘right-hand’ polarisation. As will be known to a person skilled in the art, the polarisation of the electromagnetic signal, whether linear, elliptical, or circular, is largely governed by physical properties of the transmit antenna such as antenna design and feed point position, and, if the antenna has more than one feed point, the choice of phase-influencing electrical components such as capacitors or inductors used in generating the electric signal. The detecting arrangement can be realized in a number of different suitable ways. In one preferred embodiment the detecting arrangement comprises a detecting antenna to primarily detect only electromagnetic radiation of a specific polarisation. In another preferred embodiment, the detecting antenna can be realised to detect any electromagnetic radiation, and a subsequent analysis of the electrical signal in the detecting arrangement can determine whether the detected electromagnetic radiation exhibits a specific polarisation.

Using the method according to the invention, simple functions of a device such as ‘on’, ‘off’, ‘brighter’, ‘darker’ etc. can easily be adjusted by using an appropriately polarised signal. In the method according to the invention, a function is associated with specific polarisation parameters, so that electromagnetic radiation corresponding to one particular function is distinct from electromagnetic radiation corresponding to a different function. Unlike in prior art remote control techniques, the method according to the invention does not require any modulation of a signal at the transmit side, nor is it necessary to demodulate a signal at the receive side. Furthermore, since the method according to the invention can be used to switch a device arrangement on or off, a switch is not required between the device arrangement and the power supply. Most advantageously, in a preferred embodiment of the invention, the device control signal can be obtained without requiring the device arrangement to be connected to a power supply, even when the device arrangement is not in operation.

A suitable remote control interface module according to the invention comprises at least one detecting arrangement for detecting electromagnetic radiation to obtain an electrical signal, whereby the detecting arrangement is realised to detect electromagnetic radiation generated in a remote control unit according to specific polarisation parameters. The remote control interface module further comprises a conversion unit for converting the obtained electrical signal into a device control signal.

An appropriate system for controlling a device arrangement comprises at least one transmit module, which transmit module comprises a signal generator for generating an electrical signal, and a transmitting arrangement for converting the generated electrical signal into electromagnetic radiation according to specific polarisation parameters. The system further comprises at least one receive module, which receive module comprises a detecting arrangement realised to detect electromagnetic radiation with the specific polarisation parameters to obtain an electrical signal, and a conversion unit for converting the obtained electrical signal into a device control signal. Furthermore, the system comprises a device control module for applying the device control signal to a device of the device arrangement.

The dependent claims and the subsequent description disclose particularly advantageous embodiments and features of the invention.

The method according to the invention is particularly suited for control of devices with a limited number of adjustable settings. An example of such as device is a lamp, whose functions can comprise on, off, brighter, darker, and colour temperature. Therefore, in the following, a lighting arrangement will be used as an example of a device arrangement, without however restricting the invention in any way. Such a lighting arrangement can comprise a number of lamps or light sources. Any lamp which is equipped with an appropriate remote control interface module might be controlled using one of the methods according to the invention. A lighting arrangement can therefore comprise a group of lamps, which may be located in a single room and controlled by a simple short-range hand-held remote control unit, or which may distributed over a wider area, for example in a theatre, and controlled by a remote control unit capable of wireless communication over greater distances.

A remote control unit for use in a system according to the invention comprises a user interface for entering a control input related to a function of the device arrangement. The control input can be entered, for example, by pressing a dedicated button on hand-held remote control, for example a “device on” or device “off” button, or a single button to toggle between these two states, i.e. a “device on/off” button. Such a remote control unit should also preferably comprise a signal generator for generating an electrical signal according to the control input, and at least one transmitting antenna for converting the electrical signal into electromagnetic radiation, according to specific polarisation parameters, for detection by the remote control interface module of the device. Preferably, the remote control unit comprises a transmitting arrangement for converting the generated electrical signal into electromagnetic radiation according to a number of different polarisation parameters depending on a control input. Thereby, a distinct polarisation is associated with each of a number of possible control inputs. For example, a control input associated with one device function can result in a left-hand circular polarisation of the electromagnetic radiation, and a control input associated with a second device function results in a right-hand circular polarisation of the electromagnetic radiation. Equally, the remote control unit can comprise a pair of transmitting antennae with different radiation characteristics, as will be described in more detail below. Such a remote control unit can then be used to control one or more device arrangements.

A single antenna pair comprising a transmit antenna in the remote control unit and a receive antenna in the remote control interface module can be sufficient for a simple function such as toggling between an ‘on’ state and an ‘off’ state as already described above. However, the method according to the invention is not limited to transmitting a single signal. To distinguish between these two signals at the receive side (i.e. in the device arrangement), a particularly preferred embodiment of the invention provides that a first generated electrical signal is converted into electromagnetic radiation according to first polarisation parameters, and a second generated electrical signal is converted into electromagnetic radiation according to second polarisation parameters. For example, a transmit antenna with two distinct feed points could be used to generate signals of different polarisation.

In an alternative realisation, the system according to the invention preferably comprises a first transmit module and a first receive module, wherein radiation characteristics of the transmitting arrangement of the first transmit module are matched to radiation characteristics of the detecting arrangement of the first receive module, and a second transmit module and a second receive module, wherein radiation characteristics of the transmitting arrangement of the second transmit module are matched to radiation characteristics of the detecting arrangement of the second receive module.

Radiation characteristics can describe the polarisation of a signal, and also the wavelength or frequency of the signal. In another possible realisation, the remote control unit can be equipped with a transmit module that can separately transmit two distinct signals, each having the same polarisation but different frequencies, by controlling the input to a VCO so that the signal generator outputs a signal at either one of two distinct frequencies, and passing this signal to a transmit arrangement where it is converted to electromagnetic radiation according to the appropriate polarisation parameters. In another example, the remote control unit may be equipped with two separate and distinct transmit modules, each of which has a signal generator, and these generate two different signals, each of which is converted to electromagnetic radiation according to appropriate polarisation parameters. The remote control unit can therefore transmit a first signal and a second signal.

Since the signals transmitted thus by the remote control unit are distinct from each other and can be separately detected, it follows that each of these signals can be allocated or assigned to different functions of the targeted device in the device arrangement. Therefore, in a further preferred embodiment, the first generated electrical signal is associated with a first device control function, and the second generated electrical signal is associated with a second device control function. The first and second device control functions can advantageously comprise functions that are intuitive opposites of each other. For instance, one pair of transmit/receive antennae could be used for a first type of function such as ‘on’ and ‘brighter’, and the other pair could be used for a second type of function such as ‘darker’ and ‘off’. Continuing with this example, the user could press an ‘on/brighter’ button on the remote control unit to turn on a lamp. As long as the user keeps the button pressed, the light output of the lamp is increased. The user can release the button when the brightness of the lamp is satisfactory. When the user releases the button, the light output remains at the selected level. Similarly, he can dim the lamp by pressing a ‘darker/off’ button until the light output has decreased to a desired level, at which point the user can release the button. By keeping the button pressed, the light output of the lamp is steadily decreased until eventually the lamp is turned off.

In another example, a hand-held remote control can have three function selectors, such as an ‘on/brighter’ button, a ‘darker/off’ button, and a rotatable button or wheel for selecting a colour temperature. In this example, each of the three input function selectors is connected to a VCO for generating a signal at a particular frequency. Therefore, a control signal at one of three distinct frequencies is generated, depending on which function selector is actuated by the user, and converted to electromagnetic radiation with specific polarisation parameters by a transmit module of the remote control unit. At the receive side, the electromagnetic radiation is detected, and forwarded to three corresponding phase frequency detectors. The frequency detector that registers the strongest match outputs a corresponding control signal to the lighting arrangement. With this approach, a user can turn on the lamp using the ‘on/brighter’ button, and keep this button pressed until the desired brightness is reached. The user can then adjust the colour temperature using the colour temperature wheel on the remote control. He can further adjust the brightness by increasing it with the 'on/brighter' button or by dimming the light output using the 'darker/off' button. When he wishes to turn off the lamp, he simply keeps the 'darker/off' button pressed until the lamp is extinguished.

With such a remote control unit, a lighting arrangement, or in fact any device arrangement, does not need a switch for turning it on or off, so that such a lighting arrangement can be directly connected to the power supply, for example to the mains power supply.

Wireless communication is governed by standards that, among others, assign frequency bands to be used by different types of devices. These standards ensure that interference is minimised between devices that are exchanging wireless signals. For example, wireless communication in a local or personal area network (LAN or PAN), with ranges of up to 100 meters, can take place in an ISM (International Scientific and Medical) frequency band. Therefore, in a particularly preferred embodiment of the invention, the generated electrical signal comprises a high-frequency signal whose frequency lies in an ISM frequency band. Several such bands are available, such as the 2.45 GHz band, the 915 MHz band, or the 5.8 GHZ band. A signal generator for generating such a signal can comprise a voltage controlled oscillator (VCO), a crystal, or other appropriate component. The signal generator can be powered by the mains power supply, for example in the case of a remote control unit installed in a wall or other permanent location. Power can also be supplied to the signal generator by the usual type of battery, or from a solar cell, a piezo-electrical element, a thermo-electrical element, etc.

The electrical signal could be generated in the remote control unit for a predefined duration, for example, a few milliseconds. Alternatively, the electrical signal can be generated as long as the user performs an appropriate action, such as pressing an appropriate button on the remote control unit, and holding the button pressed until the targeted device reacts.

The electrical signal can be continuously generated, i.e. as a continuous signal without interruption. In a preferred embodiment of the invention, the electrical signal comprises a pulsed high-frequency signal, i.e. the signal generator outputs a series of high-frequency pulses, perhaps with the aid of a suitable capacitor, as will be known to a person skilled in the art. One advantage of this technique is that the life-span of a battery powering the signal generator is prolonged. More importantly, pulsing allows the energy of the electrical signal—i.e. its amplitude—to effectively be increased, giving the signal a longer range, and/or improving the switching reliability. At the same time, this technique can be applied to ensure that an average energy of the signal does not exceed a threshold defined by safety regulations. Again, the signal generated in this way can be of a predefined duration, or may be generated as long as the user carries out the appropriate action with the remote control device.

As already indicated, the electrical signal is transmitted by the transmit antenna of the remote control unit. The simplest type of antenna radiates in all directions, so that the energy of the signal being transmitted is also distributed in all directions. It follows that only a small fraction of the signal energy arrives at the detecting antenna. Such a signal would therefore have to be of a sufficient amplitude in order to be reliably detected. An example of such a simple antenna is the dipole antenna. However, the range of a wireless signal can be increased when a directional antenna is used, as will be known to a person skilled in the art. Examples of state of the art antennae suitable for use in short-range wireless communication are patch antennae or micropatch antennae. Alternatively, a phased-array antenna could be used, for example as described in WO2005086281 A1. In a preferred embodiment of the invention, a transmitting antenna is therefore a directional antenna, so that the energy of the signal being transmitted is essentially focussed in one main direction. Naturally, this requires that the remote control unit containing the transmitting antenna must be aimed in the direction of the remote control interface unit of the device to be controlled. In the case of a hand-held remote control unit, the user generally does this anyway, for example by aiming the remote control at the lighting arrangement in order to dim the light. In the case of a wall-mounted remote control unit, the antenna can easily be positioned to always point in the right direction, particularly since a lighting arrangement is generally a permanent fixture and is not moved about.

To ensure that electromagnetic radiation with a certain polarisation can reliably be detected, the appropriate characteristics of a detecting antenna in the detecting arrangement are preferably matched to those of a transmitting antenna in the transmit arrangement. Therefore, in a receive module according to the invention, a detecting arrangement for detecting electromagnetic radiation transmitted by a transmit antenna using specific polarisation parameters is realised such that primarily only that electromagnetic radiation is detected by the detecting antenna. This can be achieved by constructing or tuning the detecting antenna accordingly, as will be known to a person skilled in the art. Alternatively, a detecting antenna can be used that detects any incoming electromagnetic radiation and is followed by a circuit that responds only to a signal exhibiting the specific polarisation parameters. For example, a detecting arrangement can comprise a detecting antenna that responds to any circularly polarised signal, followed by a suitable circuit that determines whether the detected signal exhibits left-hand or right-hand polarisation.

In the receive module, the detecting arrangement is followed by a conversion unit to convert the detected AC signal into a signal that can be used to control the device arrangement. For example, if the signal generator in the remote control unit comprises a VCO for generating a signal at one of a number of different frequencies, where each frequency is assigned to a particular device arrangement, a corresponding conversion unit in a remote control interface module of such a device arrangement preferably comprises a frequency detector tuned to its assigned frequency. Similarly, when the signal generator can provide signals at two distinct frequencies, associated with two distinct functions of a device arrangement, the corresponding conversion unit of the device arrangement could comprise two frequency detectors, each tuned to the appropriate frequency. In each case, the output of the conversion unit is used to control the device accordingly.

In one preferable realisation of the remote control interface module according to the invention, the conversion unit comprises a passive rectifier circuit. Such a circuit can convert the AC signal induced by the receiving antenna to an output DC signal, using entirely passive components such as a high-frequency diode and a capacitor. These components are termed passive components because their function does not require an additional external current supply. The DC output signal can be used for example to toggle a switch for an on/off function of the device arrangement, or another suitable signal to adjust the current or voltage of a light source in order to dim the light source or alter the colour temperature of the light output.

A signal arriving at the detecting arrangement of the remote control interface module may, under certain conditions, be relatively weak. In the case of a detecting arrangement comprising two detecting antennae, each of which should detect a distinct signal, the low signal levels would result in correspondingly low DC signal levels, and may result in an inability of the remote control interface module to determine which device function was intended. The weak DC signal at the rectifier output can be boosted in the conversion unit by means of an appropriate voltage doubler or voltage multiplier to provide a stronger device control signal for the device control module. An example of such a voltage multiplier is a Villard cascade circuit, comprising an arrangement of capacitors and diodes. Other alternative voltage doubler circuits are possible, as will be clear to a person skilled in the art.

In a further realisation of the conversion unit, the detecting arrangement comprises a radio-frequency comparator circuit to directly compare the incoming radio-frequency signals picked up by the detecting antennae and to deliver an output signal corresponding to the strongest received signal. Such radio-frequency comparators are known from the state of the art. This approach has the advantage that radio-frequency signals of very low levels can be reliably detected, so that the range between remote control unit and device arrangement can be greater. The comparator can be powered from the mains power supply or a battery, for example, or from a rechargeable source of power, recharged using, for instance, a solar cell, thermo-electric cell, etc., or the mains power if the device arrangement is currently in operation.

In another realisation, a comparator for comparing DC signals could be applied at the output of two rectifier modules in a remote control interface unit that has two detecting antennae, in order to compare the DC signal outputs of the two rectifier circuits. This realisation is suitable to situations in which the difference in signal strength of the signals detected by the detecting antennae is marginal, and there is a corresponding small difference between the DC signals at the rectifier outputs. The output of the comparator is then used as the device control signal in the device control module for the appropriate device function.

A particularly preferred embodiment of the remote control interface module according to the invention can be advantageously used to turn a device arrangement off in such a way that the device does not consume any power when turned off, but can still be reactivated using the remote control unit. This is in contrast to prior art techniques of turning a device 'off', when what actually happens is that the device is placed in a so-called 'standby mode', and only appears to be turned off. In this standby mode, the device can conveniently be turned on again using a remote control with, for example, an infra-red interface. Naturally, a prior art remote control interface module of such a device needs to be permanently 'awake' or receptive in order to detect the infra-red signals directed at it by the remote control. In this standby mode, the device is not truly off or quiescent, since a small amount of power is still consumed by the device control interface which needs to be awake, and for a 'standby LED' to indicate to the user that the device is still connected to the mains power supply.

In order to activate and deactivate a device of the device arrangement using the device control signal output by the passive conversion unit, the remote control interface module according to the invention preferably also comprises a switch for actuating by the device control signal to toggle a device of a device arrangement between an operating mode in which current is drawn by the device during operation and an inactive mode in which the device is completely disconnected from its power supply so that no current is drawn by that device. In the preferred embodiment of the invention, the electrical signal detected by the detecting arrangement is passively converted into a device control signal, and a switch is actuated using the device control signal to switch a device of the device arrangement between an operating mode in which current is drawn by the device during operation, and an inactive mode, also called 'dormant' or 'quiescent mode', in which the device is completely disconnected from the power supply so that no current is drawn by that device. In other words, when deactivated, the device does not consume any power, in contrast to a prior art device in the so-called 'standby' mode. As already mentioned, the actuating switch in the remote control interface module of a device can be a simple toggle switch, so that the actuating signal causes the switch to be closed if it was already opened, and opened if it was already closed. This particularly advantageous embodiment of the invention can result in a reduction of power consumed by, for example, any consumer electronics device, most of which are operated for only a few hours each day, and which are usually placed in a standby mode for the remaining duration. The conversion unit with straightforward rectification using only passive components, as described above, is particularly suited for switching the device arrangement into a true 'off' mode in which the device arrangement does not draw any current.

In a preferred embodiment of the invention, the remote control interface module is incorporated in the device arrangement. Since the components required for the remote control interface module are small and inexpensive, a device arrangement such as those described above can easily be adapted to include a remote control interface module according to the invention. Adaptation could take place during the manufacturing process, but it also conceivable that an already existing device arrangement could be modified to include the type of remote control interface module disclosed here. Advantageously, the remote control interface module described above can act as a preliminary stage for a state of the art remote control interface for a device with more complex functions, as outlined above, since the user can control these complex functions in the usual remote control manner, while the simpler functions, such as activating the device arrangement from a true off state can be controlled using one of the methods according to the invention. Evidently, a remote control interface module for an existing device could simply be placed between the device and its power supply, for example between the mains plug of the device and an electrical socket, so that a modification of the device itself is not required.

Any signal such as a high-frequency signal in an ISM band can be encoded or modulated to carry information which can be decoded at the receiving end. Therefore, in a further preferred embodiment of the invention, the first electrical signal comprises a carrier signal modulated to carry device identification information prior to being converted to electromagnetic radiation according to the specific polarisation parameters. The device identification information, can be, for example, a device identification code used at the receive side to identify the device to be controlled. This can be advantageous when several device arrangements are controlled by remote control units using the method according to the invention, or, more particularly, when a single remote control unit is used to control more than one device arrangement. In such a case, the remote control unit can be equipped with different buttons for addressing the different device arrangements, and for each device activated or deactivated with this remote control, the actuating switch is opened or closed on the basis of the device identification information.

As already indicated, the remote control unit according to the invention is suitable for selecting relatively simple device functions. For a device that also features more complex functions, for example a television, the simple remote control unit described above could be used to perform the simple functions such as on/off, and a separate prior art remote control could be used for selecting the other more complex functions. However, it would be most advantageous, particularly from the user's point of view, to be able to use a single remote control unit for controlling a device. Therefore, a prior art type of remote control unit can be augmented by the functions of a remote control unit according to the invention. For instance, a manufacturer would only need to carry out minor adaptations to a prior art remote control unit, for example by including an additional antenna and any circuitry required for a particular polarisation, and another control input, such as a button, for the simple device function. Other components already included in the prior art remote control device, such as a voltage controlled oscillator for a frequency generator, could be adapted as necessary for the method according to the invention.

Most hand-held remote controls have an array of buttons for the various device functions, and a wireless mode of communication for transmitting control signals to a device, for example an infrared diode for generating an infrared control signal which is detected by a sensor in a corresponding interface of the device to be controlled. Other types of remote control use a Bluetooth interface suitable for short range personal area network (PAN), with a range of a few meters, e.g. up to 10 m, in the 2.45 GHz band. It will be clear to a person skilled in the art that these known types of remote control could easily be adapted to include the components necessary for controlling a device arrangement using method according to the invention. Adaptations to the remote control should evidently be supported by corresponding modifications in the remote control interface unit of the device arrangement.

A light source can essentially only be controlled to be turned on or off, to be made brighter, to be made less bright (dimmed), or to alter its colour temperature. Generally, most light sources share these one or more of these functions. Therefore, a single remote control unit according to the invention, comprising one or more directional antennae, can advantageously be used to control different lighting arrangements, without the need for additional modulation of the control signal to separately address the lighting arrangements. Each separate lighting arrangement need only comprise an appropriate remote control interface unit, located somewhere convenient such as a pedestal or socket of one of the light sources of the lighting arrangement. Controlling multiple lighting arrangements using a single remote control unit and by using the same signals for each lighting arrangement can be made possible since lighting arrangements are generally not located directly beside each other, but separated by a distance large enough to allow reliable and accurate control. For instance, the remote control interface module of a first lighting arrangement can be incorporated in the socket of a ceiling lighting fixture. The user controls this lighting arrangement by aiming the remote control unit at the lighting arrangement on the ceiling. The remote control interface module of a second lighting arrangement can be incorporated in the pedestal of an upright or standard lighting fixture. To control this device, the user aims the remote control unit at the standard lamp. This allows a particularly economical realisation of the system according to the invention, since several different lighting arrangements can be equipped with identical remote control interface modules, and a single remote control unit can be used for their control.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
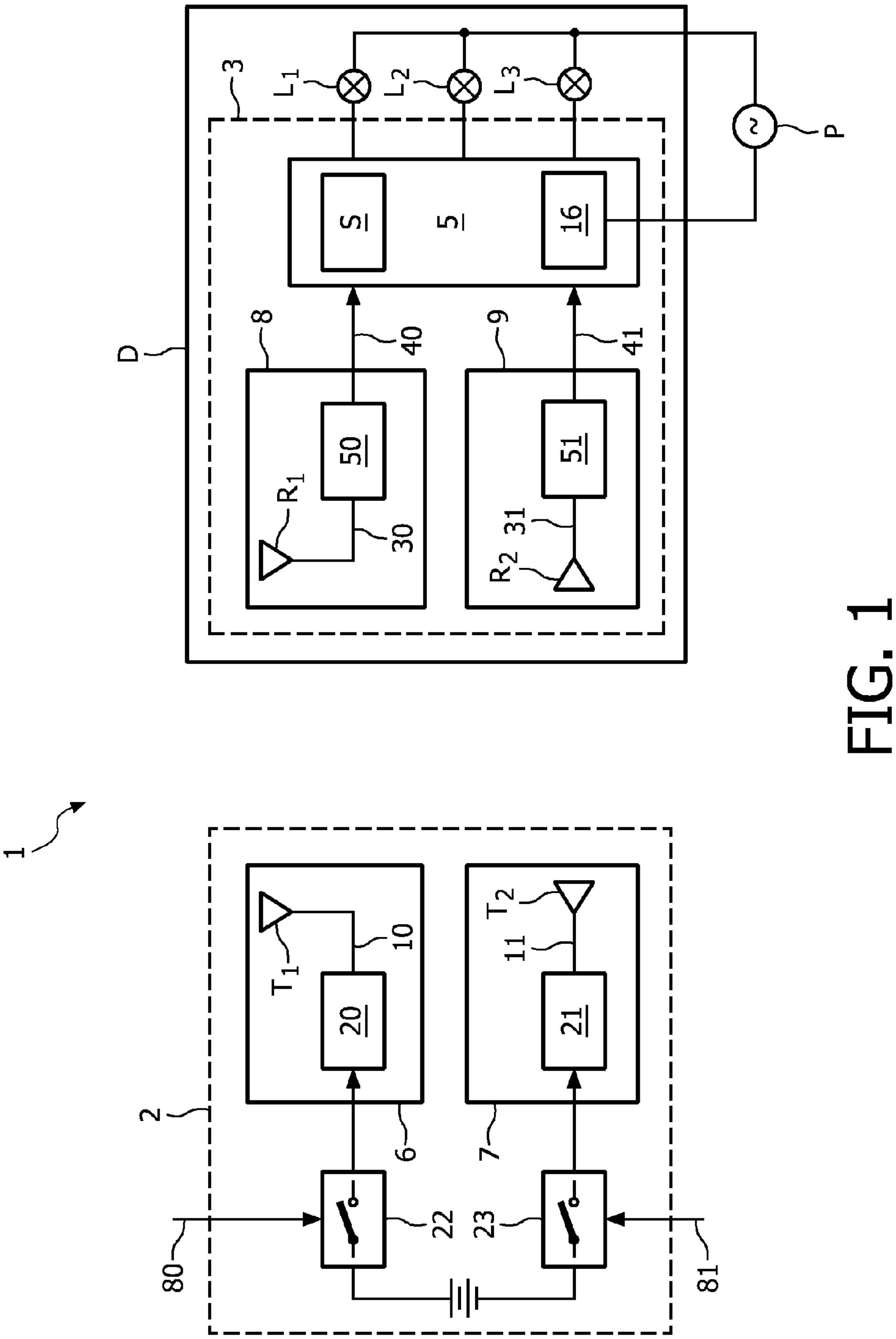
FIG. 1 shows a schematic representation of a system for controlling a device arrangement according to a first embodiment of the invention.

Using a lighting arrangement as an exemplary device arrangement, FIG. 1 shows a schematic representation of a system 1 for controlling a device arrangement D. The system 1 comprises a remote control unit 2 and the lighting arrangement D, which is shown in the diagram to include a remote control interface module 3. The lighting arrangement D comprises three light sources $L_1$, $L_2$, $L_3$ which can be connected to a mains power supply P.

Using the remote control unit 2, a user (not shown in the diagram) can enter a control input 80, 81. Each of the control inputs 80, 81 can close a corresponding switch 22, 23 to connect a battery B to a signal generator 20, 21 in a transmit module 6, 7. To clarify, switch 22 connects the battery B to the signal generator 20 in transmit module 6, and switch 23 connects the battery B to the signal generator 21 in transmit module 7. While this is not explicitly shown in the diagram for the sake of simplicity, it will be understood that only one switch 22, 23 can be activated at any one time, and therefore also only one signal generator 20, 21 can be active at any one time.

The signal generator 20, 21 thus activated generates a corresponding radio-frequency electrical signal 10, 11 in an ISM band, as already explained. The electrical signal 10 is forwarded to a first transmit antenna $T_1$, while the electrical signal 11 is forwarded to a second transmit antenna $T_2$. Again, only one of these electrical signals 10, 11 is generated at any one time. Depending on which switch 22, 23 was closed, the corresponding electrical signal 10, 11 is converted into electromagnetic radiation $EM_1$, $EM_2$ according to specific polarisation parameters by the corresponding transmit antenna $T_1$, $T_2$.

The electromagnetic radiation $EM_1$, $EM_2$ travels through free space and is detected by corresponding detecting modules 8, 9 in the remote control interface module 3. Electromagnetic radiation $EM_1$ transmitted by the first transmit antenna $T_1$ is detected by a detecting antenna $R_1$ whose radiation characteristics match those of the first transmit antenna $T_1$. Similarly, electromagnetic radiation $EM_2$ transmitted by the second transmit antenna $T_2$ is detected by a detecting antenna $R_2$ whose radiation characteristics match those of the second transmit antenna $T_2$.

A radio-frequency AC electrical signal 30, 31 detected by a detecting antenna $R_1$, $R_2$ is converted in a conversion unit 50, 51 of the corresponding detecting module 8, 9 to provide a DC device control signal 40, 41. The device control signal 40 serves to control the device D to perform according to the function selected by the user and triggered by the control input 80. Similarly, device control input 41 serves to control the device D to perform according to the function selected by the user and triggered by the control input 81. To this end, the device control signals 40, 41 are forwarded to a device control module 5.

In this embodiment, the device control module 5 includes a switch S which can be closed (when switch 22 was closed by control input 80), and a light output regulator 16 which regulates the brightness of the light sources $L_1$, $L_2$, $L_3$ of the lighting arrangement D to cause the light output of the light sources $L_1$, $L_2$, $L_3$ to be increased (up to a limit) as long as switch 22 is closed by control input 80. Similarly, the light output regulator 16 regulates the brightness of the light sources $L_1$, $L_2$, $L_3$ of the lighting arrangement D to cause the light output of the light sources $L_1$, $L_2$, $L_3$ to be decreased or dimmed as long as switch 23 is closed by control input 81. If the user keeps switch 23 closed until the light sources $L_1$, $L_2$, $L_3$ are dimmed to their lowest limit, the switch S is opened, and the lighting arrangement D is disconnected from the power supply. In this embodiment, therefore, the lighting arrangement D does not draw any current from the power supply P when turned off using the remote control unit 2.

Figure 2:
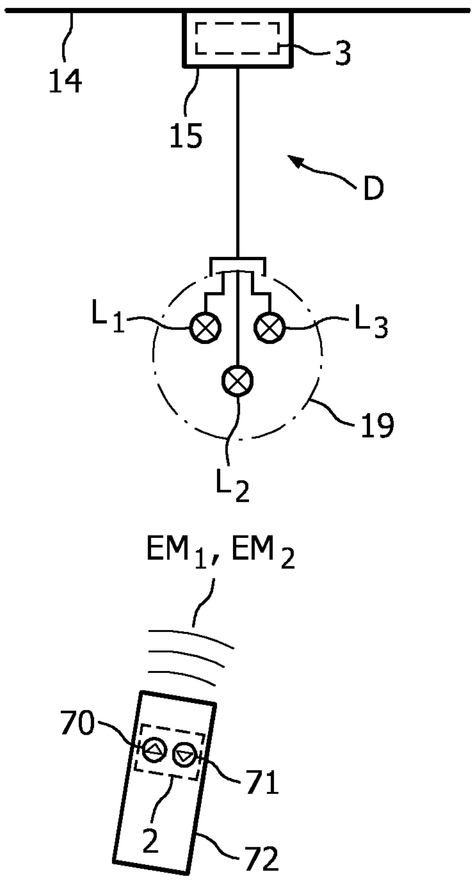
FIG. 2 shows a graphical representation of a system for controlling a device arrangement according to the embodiment of FIG. 1.

The system 1 explained schematically in FIG. 1 is shown in a graphical representation in FIG. 2. Here, the lighting arrangement D is a remote controllable lamp D mounted by means of a ceiling fixture 15 to hang from a ceiling 14. The remote control interface module 3 is incorporated in the ceiling fixture 15. The light sources $L_1$, $L_2$, $L_3$ of the lamp D are enclosed in a glass dome 19. A user (not shown in the diagram) can control the functions of the lamp D by means of a hand-held remote control unit 72 in which is incorporated the remote control interface module 2 described in FIG. 1. A control input to the remote control interface module 2 can be entered by either of two buttons 70, 71. Here, button 70 is associated with the device control function 'on/brighter', while button 71 is associated with the function 'darker/off'. Depending on which of the two buttons 70, 71 the user presses, electromagnetic radiation $EM_1$, $EM_2$ is generated and detected by one of the detecting antennae $R_1$, $R_2$ in the remote control interface module 3, and the lamp D is controlled accordingly.

Other possible techniques of converting an electrical signal detected by a receiving antenna into a device control signal are explained with the aid of FIGS. 3*a*-3*d*. In each case, only the units or modules relevant to the conversion are shown.

Figure 3A:
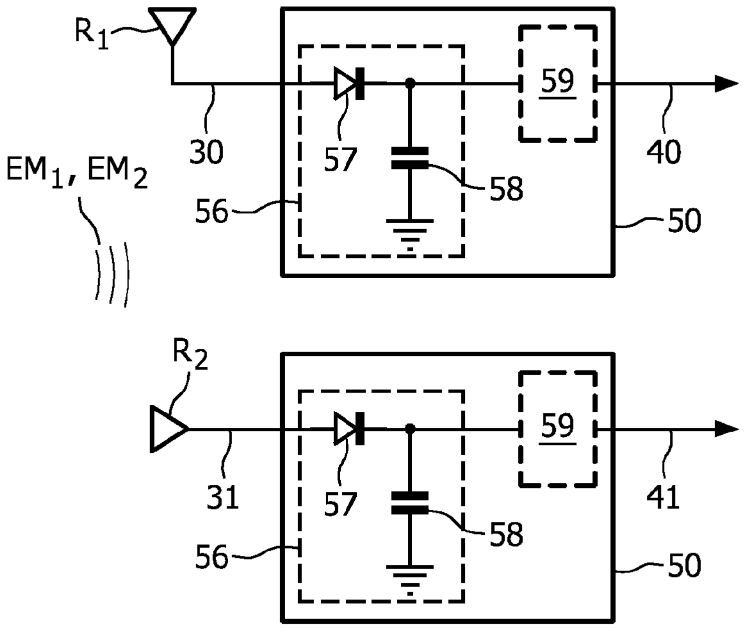
FIG. 3*a* shows a schematic representation of a first embodiment of a conversion unit for use in a remote control interface module according to the invention.

In FIG. 3*a*, the conversion unit 50 for each signal 30, 31 detected by a corresponding detecting antenna $R_1$, $R_2$ includes a passive rectifier circuit 56, which uses a diode 57 and a smoothing capacitor 58 to produce a smoothed and rectified DC signal. If the electromagnetic radiation $EM_1$, $EM_2$ is sufficiently strong, the DC signal output by the rectifier circuit can be directly used as a device control signal 40, 41. However, if this is not the case, the conversion unit 50 can include a suitable voltage multiplier circuit 59 to increase the signal level of the device control signal, so that this can reliably be used to control the device. FIG. 3*a* shows two conversion units 50, one for each detecting antenna $R_1$, $R_2$. Obviously, in a remote control interface module with only one detecting antenna, a single conversion unit 50 will suffice.

Figure 3B:
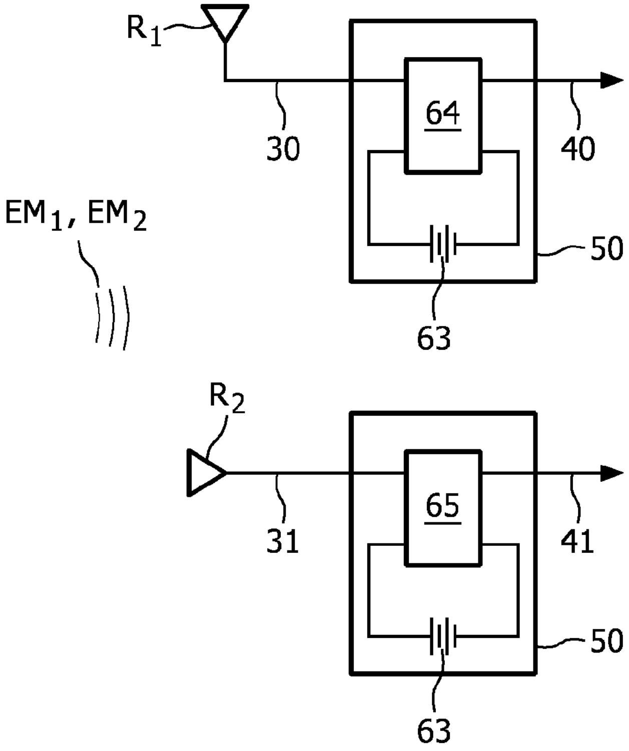
FIG. 3*b* shows a schematic representation of a second embodiment of a conversion unit for use in a remote control interface module according to the invention.

FIG. 3*b* shows another realisation of a conversion unit 50. Again, one conversion unit 50 is used for each of the two detecting antennae $R_1$, $R_2$. The conversion unit 50 for detecting antenna $R_1$ includes a phase frequency detector 64 tuned to respond to the frequency of a control signal associated with a first device control function and transmitted as electromagnetic radiation $EM_1$. Similarly, the conversion unit 50 for detecting antenna $R_2$ includes a phase frequency detector 65 tuned to respond to the frequency of a control signal associated with a second device control function and transmitted as electromagnetic radiation $EM_2$. This realisation allows for a number of different frequency/polarisation combinations. For example, the first detecting antenna $R_1$ responds to a first polarisation, and the second detecting antenna $R_2$ responds to a second polarisation, while each phase frequency detector 64, 65 is tunable to either of a first or second frequency. A transmit module equipped with two transmit antennae and two frequency generators can therefore transmit four distinct signals in the combinations first frequency/first polarisation; first frequency/second polarisation; second frequency/first polarisation, and second frequency/second polarisation. These signals can be associated with the functions 'on', 'off', 'brighter', and 'darker', respectively. The device control signal 40, 41 output from a conversion unit 50 therefore serves to control the device according to the selected function. A phase frequency detector 64 requires a power supply 63, which can be a battery, solar cell, thermo-electric cell, etc.

Figure 3C:
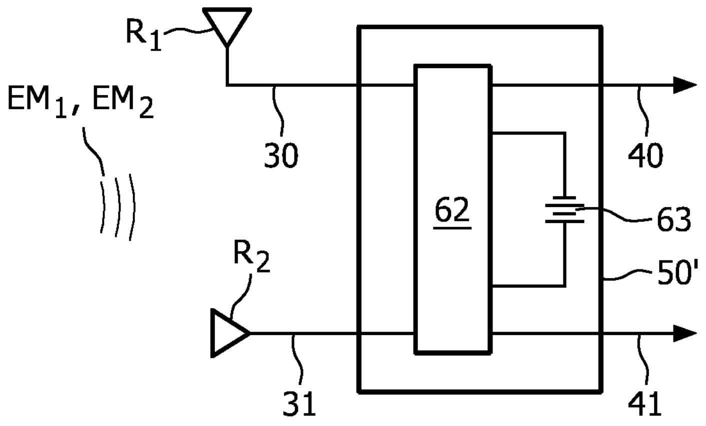
FIG. 3*c* shows a schematic representation of a third embodiment of a conversion unit for use in a remote control interface module according to the invention.

FIG. 3*c* shows a further alternative realisation, suitable for conditions in which the signals 30, 31 detected by the detecting antennae $R_1$, $R_2$ are not sufficiently different, so that it cannot be clearly determined which device function is being controlled. Here, the conversion unit 50' performs radio-frequency signal comparison on both detected signals 30, 31 using an RF-comparator 62 to determine which of the signals is the stronger. This technique has the advantage of being accurate even when the incoming signals 30, 31 have low signal energies. Depending on which of the signals 30, 31 was stronger, the conversion unit 50' outputs a device control signal 40, 41 accordingly. In this realisation also, the RF-comparator 62 requires a power supply 63.

Figure 3D:
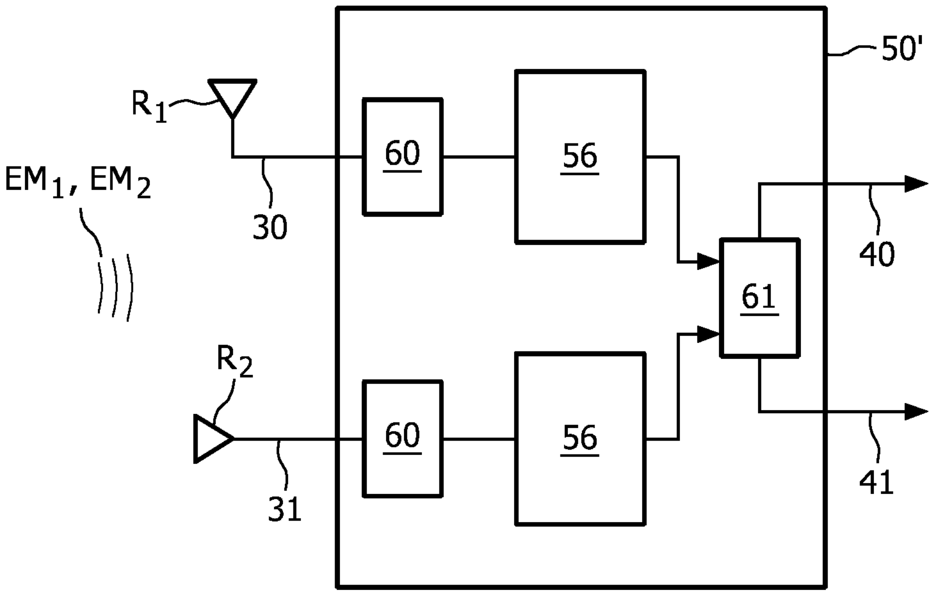
FIG. 3*d* shows a schematic representation of a fourth embodiment of a conversion unit for use in a remote control interface module according to the invention.

Another realisation of a conversion unit 50', involving signal comparison, is shown in FIG. 3*d*. Here, the input signals 30, 31 detected by the detecting antennae $R_1$, $R_2$ may have low energy levels and therefore be difficult to distinguish. Each AC input signal 30, 31 is first amplified using a low noise amplifier 60 before being subject to rectification, in this case using a rectifier circuit as described under FIG. 3*a*. The resulting DC output signals are then compared in a comparator 61 which outputs a device control signal 40, 41 according to the strongest rectifier output signal. A power supply, not shown in the diagram, may be required by the low noise amplifier 60 and/or the comparator 61.

Figure 4:
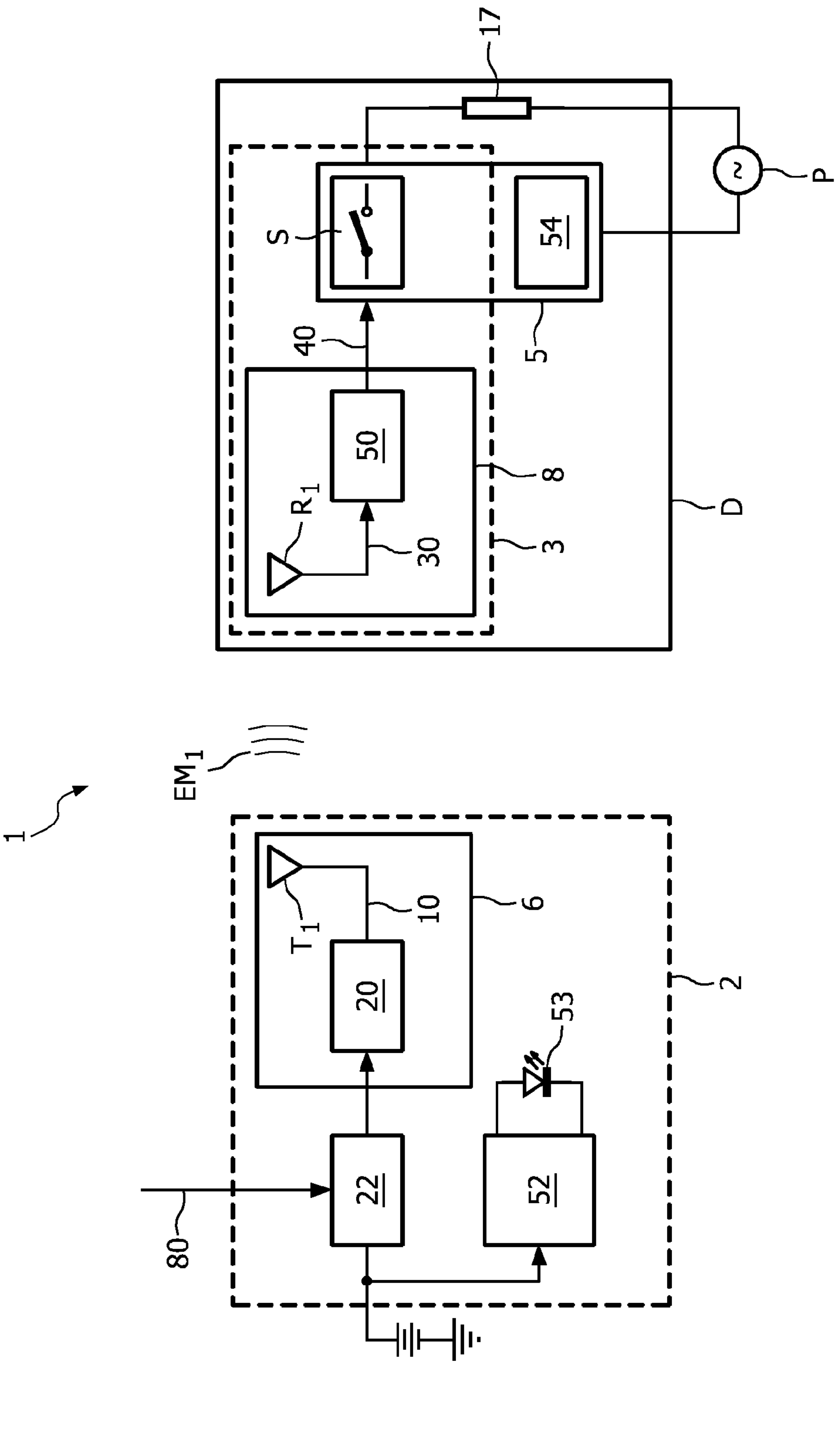
FIG. 4 shows a schematic representation of a system for controlling a device arrangement according to a second embodiment of the invention.

FIG. 4 shows a second embodiment of a system 1 according to the invention. Here, a remote control unit 2 includes a single transmit module 6 for transmitting electromagnetic radiation $EM_1$ using specific polarisation parameters for a control signal 10 which is generated by a signal generator 20 when a corresponding control input 80 causes a switch 22 to be closed. The electromagnetic radiation $EM_1$ is detected by a detecting module 8 in a remote control interface module 3 incorporated in a device D, which might be a television or other such device capable of being remotely controlled, and with an effective load represented by an impedance 17. The device D comprises a device control module 5 in which appropriate function control signals are generated.

The detecting module 8 comprises a detecting antenna $R_1$ and a conversion unit 50 such as described in FIG. 3*a* or FIG. 3*b* above for outputting a device control signal 40. The detecting module 8 in this remote control interface module 3 is responsive to the specific polarisation parameters, while any other devices in the vicinity would have detecting arrangements responsive to other specific polarisation parameters.

By means of the control input 80 and a toggle switch S, the device D can be connected to the power supply P (switch S is closed) or disconnected from the power supply P (switch S is opened). The user applies this control input 80 by pressing an 'on/off' button (not shown in the diagram) connected to the switch 22.

Here, the remote control unit 2 also comprises a usual infrared remote control module 52 and an infrared diode 53, indicated in a simplified manner in the diagram. A beam of infrared light is detected by a corresponding device control interface 54 so that the user can control the device $D_1$ in the usual manner. The remote control unit 2 shown here with its components such as the signal generator 20 and transmitting antenna $T_1$ could easily be incorporated into the usual type of hand-held remote control device familiar to most users.

For the sake of clarity, it is to be understood that the use of "a" or "an" throughout this application does not exclude a plurality, and "comprising" does not exclude other steps or elements. A "unit" or "module" can comprise a number of units or modules, unless otherwise stated.

The invention claimed is:

1. A method of controlling a device arrangement (D), which method comprises:

generating at least one electrical signal in a remote control unit;

converting the generated electrical signal into electromagnetic radiation ($EM_1$, $EM_2$) according to specific polarization parameters;

detecting the electromagnetic radiation ($EM_1$, $EM_2$) with a detecting arrangement ($R_1$, $R_2$), which detecting arrangement ($R_1$, $R_2$) is realized to detect electromagnetic radiation ($EM_1$, $EM_2$) with the specific polarisation parameters, to obtain an electrical signal;

converting the obtained electrical signal into a device control signal dependent upon the specific polarization parameters;

applying the device control signal to a device ($L_1$, $L_2$, $L_3$) of the device arrangement (D); and operating the device in accordance with the device control signal.

2. The method according to claim 1, wherein the generated electrical signal comprises a high-frequency signal whose frequency lies in an ISM frequency band.

3. The method according to claim 1, wherein the generated electrical signal comprises a pulsed high-frequency signal.

4. The method according to claim 1, wherein a first generated electrical signal is converted into electromagnetic radiation ($EM_1$) according to first specific polarization parameters, and a second generated electrical signal is converted into electromagnetic radiation ($EM_2$) according to second specific polarization parameters.

5. The method according to claim 4, wherein the first generated electrical signal is associated with a first device control function, and the second generated electrical signal is associated with a second device control function.

6. The method according to claim 1, further comprising:

passively converting said obtained electrical signal into said device control signal; and actuating a switch (S) using the device control signal to switch a device ($L_1$, $L_2$, $L_3$) of the device arrangement (D) between an operating mode in which current is drawn by the device ($L_1$, $L_2$, $L_3$) from a power supply (P) during operation, and an inactive mode in which the device ($L_1$, $L_2$, $L_3$) is completely disconnected from the power supply (P) so that no current is drawn by that device ($L_1$, $L_2$, $L_3$).

7. A remote control interface module comprising at least one detecting arrangement ($R_1$, $R_2$) for detecting electromagnetic radiation ($EM_1$, $EM_2$) to obtain an electrical signal according to specific polarisation parameters; and a conversion unit for converting the obtained electrical signal into a device control signal associated with said specific polarisation parameters.

8. The remote control interface module according to claim 7, comprising a first detecting arrangement ($R_1$) for detecting electromagnetic radiation ($EM_1$) to obtain a first electrical signal, whereby the first detecting arrangement ($R_1$) is realised to detect electromagnetic radiation ($EM_1$) generated in a remote control unit according to first specific polarization parameters; and a second detecting arrangement ($R_2$) for detecting electromagnetic radiation ($EM_2$) to obtain a second electrical signal, whereby the second detecting arrangement ($R_2$) is realised to detect electromagnetic radiation ($EM_2$) generated in a remote control unit according to second specific polarization parameters.

9. A device arrangement (D) comprising a remote control interface module according to claim 7.

10. A system for controlling a device arrangement (D) comprising:

at least one transmit module comprising: a signal generator generating an electrical signal, and a transmitting arrangement ($T_1$, $T_2$) converting the generated electrical signal into electromagnetic radiation ($EM_1$, $EM_2$) according to specific polarization parameters, wherein said specific polarization is based on a control input;

at least one receive module comprising:

a detecting arrangement ($R_1$, $R_2$) detecting said electromagnetic radiation ($EM_1$, $EM_2$) with the specific polarisation parameters to obtain an electrical signal, and a conversion unit converting the obtained electrical signal into a device control signal associated with said specific polarization parameters; and a device control module:

applying the device control signal to a device ($L_1$, $L_2$, $L_3$) of the device arrangement (D); and operating the device arrangement in accordance with the device control signal.

11. The system according to claim 10, which system comprises:

a first transmit module and a first receive module, wherein radiation characteristics of the transmitting arrangement ($T_1$) of the first transmit module are matched to radiation characteristics of the detecting arrangement ($R_1$) of the first receive module; and a second transmit module and a second receive module, wherein radiation characteristics of the transmitting arrangement ($T_2$) of the second transmit module are matched to radiation characteristics of the detecting arrangement ($R_2$) of the second receive module.

12. The system according to claim 10, wherein said conversion unit comprises:

a passive conversion unit passively converting said obtained electrical signal into said device control signal, wherein the device control signal comprises a switch actuating signal for actuating a switch (S) to switch a device ($L_1$, $L_2$, $L_3$) of the device arrangement (D) between an operating mode in which current is drawn by the device ($L_1$, $L_2$, $L_3$) during operation, and an inactive mode in which the device (D) is completely disconnected from the power supply (P) so that no current is drawn by the device ($L_1$, $L_2$, $L_3$).

13. The system (1) according to claim 10, wherein the device arrangement (D) comprises a lighting arrangement (D) comprising at least one lamp ($L_1$, $L_2$, $L_3$).

14. A remote control unit comprising:

a user interface for inputting a control input;

a signal generator for generating an electrical signal, according to the control input; and at least one transmitting arrangement ($T_1$, $T_2$) for converting the generated electrical signal into electromagnetic radiation ($EM_1$, $EM_2$), according to specific polarization parameters, said specific polarization parameters being determined based on said inputted control input.

* * * * *